(12) United States Patent
Nimkar et al.

(10) Patent No.: US 12,271,941 B2
(45) Date of Patent: Apr. 8, 2025

(54) MACHINE LEARNING METHODS FOR COMMERCIAL LEASE BENCHMARKING AND DEVICES THEREOF

(71) Applicant: JONES LANG LASALLE IP, INC., Chicago, IL (US)

(72) Inventors: Pradnya Nimkar, Newark, CA (US); Utkarsh Porwal, Santa Clara, CA (US); Gurdit Chahal, Elk Grove, CA (US)

(73) Assignee: JONES LANG LASALLE IP, INC., Chicago, IL (US)

( * ) Notice: Subject to any disclaimer, the term of this patent is extended or adjusted under 35 U.S.C. 154(b) by 232 days.

(21) Appl. No.: 18/096,472

(22) Filed: Jan. 12, 2023

(65) Prior Publication Data
US 2024/0242266 A1 Jul. 18, 2024

(51) Int. Cl.
*G06Q 30/00* (2023.01)
*G06Q 30/0645* (2023.01)
*G06Q 50/163* (2024.01)

(52) U.S. Cl.
CPC ....... *G06Q 30/0645* (2013.01); *G06Q 50/163* (2013.01)

(58) Field of Classification Search
None
See application file for complete search history.

(56) References Cited

U.S. PATENT DOCUMENTS

| | | | |
|---|---|---|---|
| 10,062,127 B1* | 8/2018 | Catalano | G06Q 50/16 |
| 2012/0253967 A1* | 10/2012 | McDevitt | G06Q 30/06 |
| | | | 705/26.4 |
| 2014/0257924 A1* | 9/2014 | Xie | G06Q 30/0202 |
| | | | 705/7.31 |
| 2015/0112879 A1* | 4/2015 | Ghosh | G06Q 50/16 |
| | | | 705/313 |

(Continued)

OTHER PUBLICATIONS

Three Chapters on the Economics of Land Conservation, Author: VanCeylon, Jarron, Publication info: University of Rhode Island, ProQuest Dissertations & Theses, 2023. (Year: 2023).*

(Continued)

*Primary Examiner* — Matthew T Sittner
(74) *Attorney, Agent, or Firm* — TROUTMAN PEPPER LOCKE LLP (57) ABSTRACT

Methods, non-transitory computer readable media, and property analysis server devices are disclosed that generate a feature dataset including property and metric data for properties includes an address and an actual lease value. A machine learning model (MLM) trained on the feature dataset is selected from different types of MLMs. A determination is made that the selected MLM exceeds an accuracy threshold based on a cross-validation using predicted lease values. The property data is stored in a lease benchmarking database with the addresses replaced in with corresponding geographic coordinates and geohash values. The properties are associated in the lease benchmarking database with the predicted lease values. One of the predicted lease (Continued)

values is returned in response to a received lease pricing request that includes an address. The returned predicted lease value is identified in the lease benchmarking database based on a geographic proximity of the address to one of the properties.

12 Claims, 7 Drawing Sheets

(56) References Cited

U.S. PATENT DOCUMENTS

| | | | | |
|---|---|---|---|---|
| 2020/0211131 | A1* | 7/2020 | Pangerl | G06Q 30/0645 |
| 2020/0294162 | A1* | 9/2020 | Shah | G06F 16/587 |
| 2021/0103998 | A1* | 4/2021 | Rose | G06Q 30/0645 |
| 2024/0005348 | A1* | 1/2024 | Guillo | G06Q 30/0201 |
| 2024/0046386 | A1* | 2/2024 | Yair | G06Q 50/16 |
| 2024/0070741 | A1* | 2/2024 | Lin | G06Q 50/165 |
| 2024/0221096 | A1* | 7/2024 | Hammill | G06Q 40/06 |

OTHER PUBLICATIONS

Adoption, Spatial Patterns, and Behavioral Mechanisms in California Turf Removal Rebate Programs, Author: Shideler, John, Publication info: The Claremont Graduate University, ProQuest Dissertations & Theses, 2020. (Year: 2020).*

Hedonic Regression of Local-Level Attraction Influences on Housing Price: Evidences from California Statewide Rent Modifier Estimation Author: Wang, Yang, Publication info: University of California, Davis. ProQuest Dissertations & Theses, 2011. (Year: 2011).*

Hedonic modelling of housing markets using geographical information system (gis) and spatial statistic:; a case study of glasgow, Scotland, Author: Ismail, Suriatini, Publication info: University of Aberdeen (United Kingdom). ProQuest Dissertations & Theses, 2005. (Year: 2005).*

* cited by examiner

MACHINE LEARNING METHODS FOR COMMERCIAL LEASE BENCHMARKING AND DEVICES THEREOF

FIELD

This technology generally relates to commercial property portfolio management systems and, more particularly, to machine learning methods and devices for automated commercial lease benchmarking.

BACKGROUND

Business intelligence gathering and analysis relating to commercial lease pricing is currently ineffective, particularly for properties with multiple leases, such as large commercial buildings in metropolitan areas that may contain many properties (e.g., floor(s)) with disparate characteristics and associated values. Property owners and brokers require fair and competitive lease pricing so as to avoid losing sales to competitors, resulting in decreased occupancy rates, while maximizing profitability. However, commercial real estate lessors currently use a significant amount of human interaction and subjective judgment to determine lease values, which can introduce bias and yields inaccurate benchmarking and pricing results.

By providing increased information, lease benchmarking accuracy can be improved. However commercial property lessors are often unable to provide a significant amount of useful information in a valuation inquiry in part because they are unaware of relevant factors or the associated data (e.g., whether a subway line exists nearby, geocodes of a property, demographic and socio-economic data, or whether a building or particular property (e.g., floor(s) of a building) is in the skyline). In fact, lease valuation inquiries often only include an address of a property. With only a property address, or a minimal amount of property data, current technology is unable to accurately and effectively value commercial property leases.

SUMMARY

A method for commercial lease benchmarking is disclosed along with non-transitory computer readable media and property analysis server devices that are configured to perform the method. Thus, the method can be implemented by one or more property analysis server devices that include memory including programmed instructions stored thereon and one or more processors configured to execute the stored programmed instructions to perform the method. In other examples, a non-transitory computer readable medium having stored thereon instructions is disclosed that includes executable code that, when executed by one or more processors, causes the one or more processors to perform the method.

The method in some examples includes selecting a machine learning model (MLM) from different types of MLMs trained on a feature dataset. The feature dataset includes property data for properties and metric data and the property data includes at least an address and an actual lease value for each of the properties. A determination is made that the selected MLM exceeds an accuracy threshold based on a cross-validation performed on the selected MLM. Predicted lease values are generated for the properties during the cross-validation.

The property data is then stored in a lease benchmarking database with the addresses replaced with corresponding first geographic coordinates and geohash values. Additionally, the properties are associated in the lease benchmarking database with the predicted lease values. One of the predicted lease values is returned in response to a received lease pricing request that comprises an address, where the returned one of the predicted lease values is identified in the lease benchmarking database based on a determined geographic proximity of the address to one of the properties.

This technology provides a number of advantages including methods, non-transitory computer readable media, and property analysis server devices that advantageously leverage an improved machine learning model trained on a feature dataset that includes raw property data and metric data calculated from the raw property data. This technology analyzes different types of MLMs to identify an optimal MLM based on the training dataset and performs a cross-validation to confirm accuracy of the selected, optimal MLM. With the selected MLM, this technology provides improved predicted lease values with a reduced amount of information and via a service that can be consumed by any number of user-facing commercial real estate (CRE) management and/or business intelligence devices.

DETAILED DESCRIPTION

Figure 1:
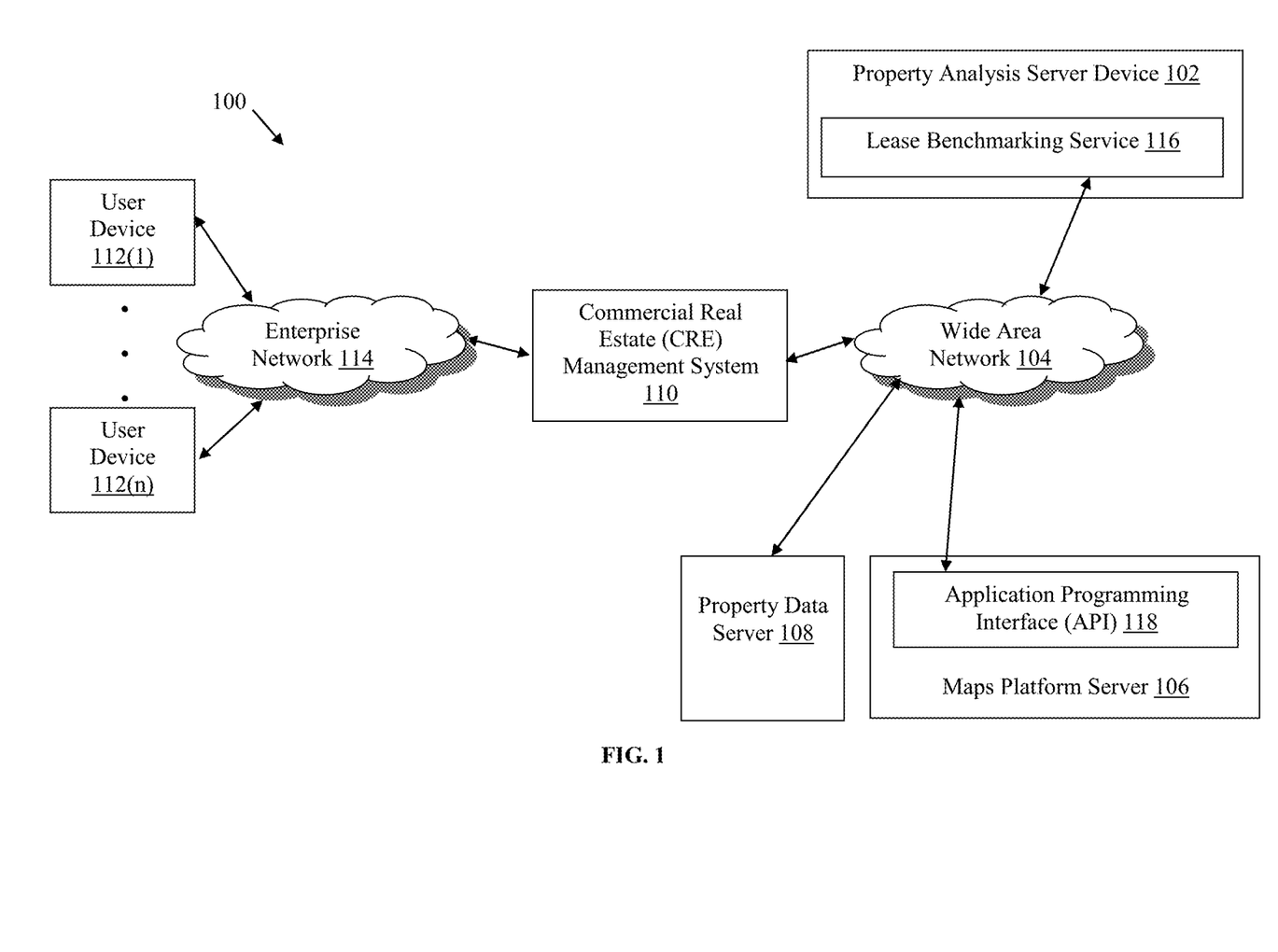
FIG. 1 is a block diagram of an exemplary network environment with a property analysis server device.

Referring to FIG. 1, an exemplary network environment 100 is illustrated that includes a property analysis server device 102 coupled, via a wide area network (WAN) 104, to a maps platform server 106, a property data server 108, and a commercial real estate (CRE) management system 110, which is coupled to user devices 112(1)-112(n) by an enterprise network 114. The network environment 100 may include other network devices such as one or more routers or switches, for example, which are known in the art and thus will not be described herein. This technology provides a number of advantages including methods, non-transitory computer readable media, and property analysis server devices that more effectively predict lease valuation for commercial property based on a machine learning model (MLM) trained on a feature dataset that includes property data and metric data generated from the property data.

In this particular example, the user devices 112(1)-112(n), CRE management system 110, property data server 108, maps platform server 106, and property analysis server device 102 are disclosed in FIG. 1 as dedicated hardware devices. However, one or more of the user devices 112(1)-

112(n), CRE management system 110, property data server 108, maps platform server 106, or property analysis server device 102 can also be implemented in software within one or more other devices in the network environment 100. As one example, the property analysis server device 102, as well as any of its components or applications, can be implemented as software executing on the CRE management system 110, and many other permutations and types of implementations and network topologies can also be used in other examples.

Figure 2:
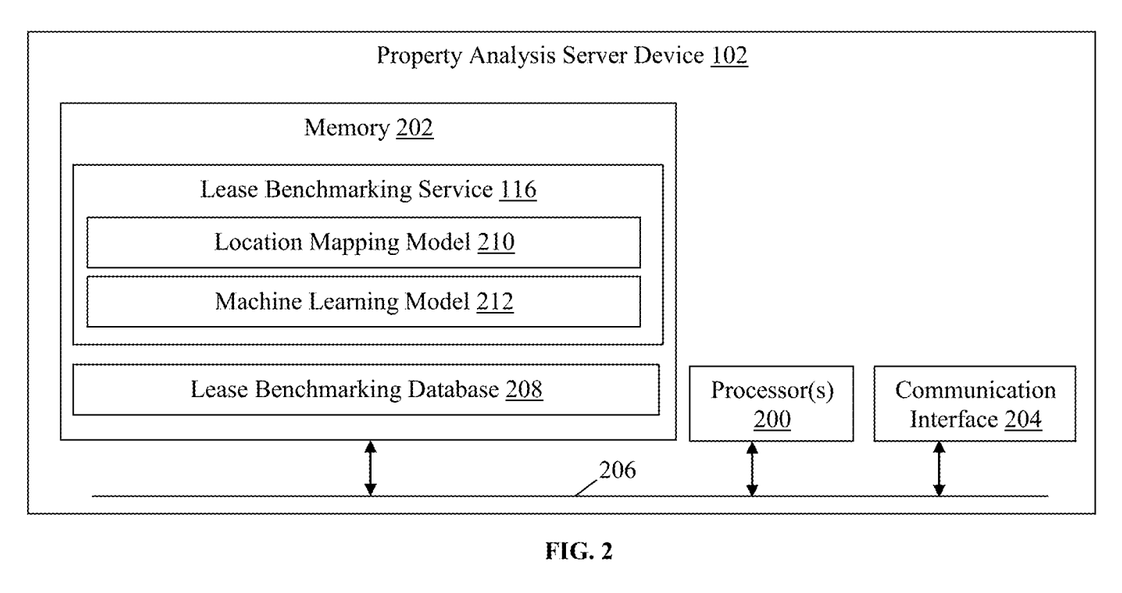
FIG. 2 is a block diagram of an exemplary property analysis server device.

Referring to FIGS. 1-2, the property analysis server device 102 of the network environment 100 may perform any number of functions, including executing a lease benchmarking service 116 that provides an endpoint to the CRE management system 110 for lease pricing requests, and processes those requests to generate and return a predicted lease value, as described and illustrated in more detail below. The property analysis server device 102 in this example includes processor(s) 200, a memory 202, and a communication interface 204, which are coupled together by a bus 206, although the property analysis server device 102 can include other types or numbers of elements in other configurations.

The processor(s) 200 of the property analysis server device 102 may execute programmed instructions stored in the memory 202 of the property analysis server device 102 for any number of the functions described and illustrated herein (e.g., with reference to FIGS. 4-7). The processor(s) 200 may include one or more central processing units (CPUs) or general purpose processors with one or more processing cores, for example, although other types of processor(s) can also be used.

The memory 202 of the property analysis server device 102 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 200, can be used for the memory 202.

Accordingly, the memory 202 can store applications that can include computer executable instructions that, when executed by the property analysis server device 102, cause the property analysis server device 102 to perform actions, such as to transmit, receive, or otherwise process network messages and requests, for example, and to perform other actions described and illustrated below with reference to FIGS. 4-7. The application(s) can be implemented as components of other applications, operating system extensions, and/or plugins, for example.

Further, the application(s) may be operative in a cloud-based computing environment with access provided via a software-as-a-service (SaaS) model. The application(s) (also referred to herein as services) can be executed within or as virtual machine(s) or virtual server(s) that may be managed in a cloud-based computing environment. Also, the application(s), and even the property analysis server device 102 itself, may be located in virtual server(s) running in a cloud-based computing environment rather than being tied to specific physical network computing devices. Also, the application(s) may be running in virtual machines (VMs) executing on the property analysis server device 102 and managed or supervised by a hypervisor.

In this particular example, the memory 202 includes the lease benchmarking service 116 and a lease benchmarking database 208. The lease benchmarking database 208 is populated with predicted lease values, generated during a cross-validation of a selected MLM, along with geographical data (e.g., coordinates and/or geohash values) of the associated properties. Accordingly, the lease benchmarking database 208 stores sanitized property data and associated predicted lease values for satisfying lease pricing requests from the CRE management system 110.

The lease benchmarking service 116 includes a location mapping model 210 and a MLM 212 in this example. The location mapping model is configured to determine geohash values based on geographic coordinates (e.g., latitude and longitude values) for properties identified in property data used to generate a feature dataset and subsequently train the MLM 212, as well as for a particular property associated with a lease pricing request. The MLM 212 is a selection one of a plurality of different types of MLMs, which is trained on a feature dataset and cross-validated, as will be explained in more detail below.

The communication interface 204 of the property analysis server device 102 operatively couples and communicates between the property analysis server device 102, CRE management system 110, property data server 108, and maps platform server 106, which are coupled together at least in part by the WAN 104, although other types or numbers of communication networks or systems with other types or numbers of connections or configurations to other devices or elements can also be used.

By way of example only, the WAN 104 and/or enterprise network 114 can use TCP/IP over Ethernet and industry-standard protocols, although other types or numbers of protocols or communication networks can be used. The WAN 104 and/or enterprise network 114 in this example can employ any suitable interface mechanisms and network communication technologies including, for example, Ethernet-based Packet Data Networks (PDNs).

While the property analysis server device 102 is illustrated in this example as including a single device, the property analysis server device 102 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the property analysis server device 102. Additionally, one or more of the devices that together comprise the property analysis server device 102 in other examples can be stand-alone devices or integrated with one or more other devices or apparatuses.

The CRE management system 110 of the network environment 100 includes one or more processors, a memory, and a communication interface, which are coupled together by a bus or other communication link, although other numbers and types of network devices could be used. The CRE management system 110 in this example executes property management applications and/or business intelligence platforms to facilitate management of, and insights regarding, a commercial property portfolio, for example. The CRE management system 110 can generate lease pricing requests to the lease benchmarking service 116 following lease pricing triggers, as described and illustrated in more detail below.

The property data server 108 of the network environment 100 includes one or more processors, a memory, and a communication interface, which are coupled together by a bus or other communication link, although other numbers and types of network devices could be used. The property data server 108 stores and provides raw property data obtained for a plurality of properties, optionally across geographic regions and CRE portfolios. The property data can include geographic data, socioeconomic data, space type, actual lease values, and other information relating to leased commercial real estate. In one example, the property data server 108 maintains a CRE information and analytics database hosted by CoStar Group of Washington, DC, although other types of property data servers hosting different types of property data can also be used in other examples.

The maps platform server 106 of the network environment 100 includes one or more processors, a memory, and a communication interface, which are coupled together by a bus or other communication link, although other numbers and types of network devices could be used. The maps platform server 106 in this example hosts an application programming interface (API) 118 that is accessible via the wide area network 104 to the lease benchmarking service 116. The API 118 is an endpoint that is configured to receive an address and return geographic coordinates. In one example, the maps platform server 106 is provided by Alphabet Inc. of Mountain View, CA and the API 118 is a Google Maps™ API, although other types of maps platform servers can also be used in other examples.

Each of the user devices 112(1)-112(n) of the network environment 100 includes processor(s), a memory, a communication interface, user input device(s), an audio input/output device, an imaging device (e.g., video camera), and/or a display device, which are coupled together by a bus or other communication link, although other numbers and types of network devices could be used. The user devices 112(1)-112(n) can be mobile devices, such as smartphones, and/or tablet or laptop computing devices, for example, that execute applications configured to communicate with the CRE management system 110 to access business intelligence and CRE management information provided by the CRE management system 110.

Although the exemplary network environment 100 with the user devices 112(1)-112(n), CRE management system 110, property data server 108, maps platform server 106, property analysis server device 102, WAN 104, and enterprise network 114 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100, such as the user devices 112(1)-112(n), CRE management system 110, property data server 108, maps platform server 106, or property analysis server device 102, for example, may be configured to operate as virtual instances on the same physical machine. In other words, one or more of the user devices 112(1)-112(n), CRE management system 110, property data server 108, maps platform server 106, or property analysis server device 102 may operate on the same physical device rather than as separate devices communicating through WAN 104 and/or enterprise network 114. Additionally, there may be more or fewer user devices, CRE management systems, property data servers, maps platform servers, and/or property analysis server devices, than illustrated in FIG. 1.

The examples of this technology may also be embodied as one or more non-transitory computer readable media having instructions stored thereon, such as in the memory 202, for one or more aspects of the present technology, as described and illustrated by way of the examples herein. The instructions in some examples include executable code that, when executed by one or more processors, such as the processor(s) 200, cause the processors to carry out steps necessary to implement the methods of the examples of this technology that are described and illustrated herein.

Figure 3:
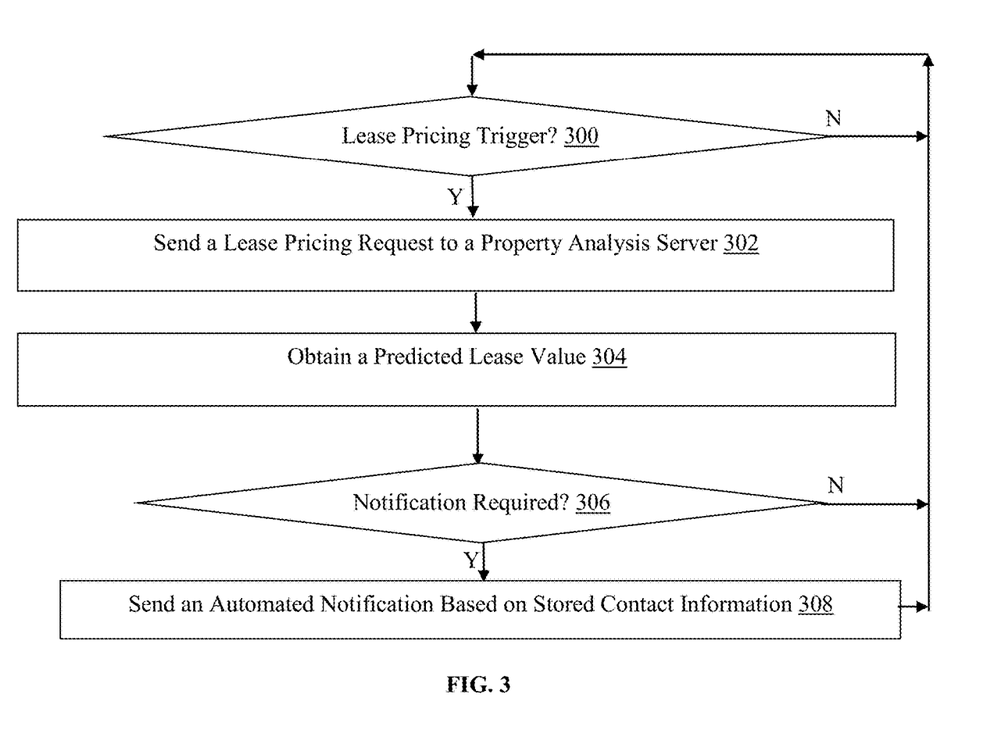
FIG. 3 is a flowchart of an exemplary method for consuming a predicted lease value from a lease benchmarking service.

Referring to FIG. 3, a flowchart of an exemplary method for consuming a predicted lease value from a lease benchmarking service is illustrated. In step 300 in this example, the CRE management system 110 determines whether a lease pricing trigger has occurred. In this particular example, the CRE management system 110 initiates a lease pricing request, and consumes a predicted lease value, but a lease pricing request can be initiated, and/or a predicted lease value can be consumed, by other devices and/or in other ways in other examples.

In some examples, the CRE management system 110 executes a CRE portfolio management application that facilitates management of a CRE portfolio for an enterprise. Accordingly, a lease pricing trigger can be a determination by the CRE portfolio management application that a lease on a particular property is ending within a specified timeframe based on stored lease data for the property. The lease pricing trigger may result in a notification to a user of one of the user devices 112(1)-112(n), for example, as explained in more detail below.

In another examples, the lease pricing trigger can be periodic and can analyze a plurality of property leases to determine whether a lessee is currently overpaying or underpaying, which also can result in a notification. If the CRE management system 110 determines that a lease pricing trigger has not occurred, then the No branch is taken back to step 300 and the CRE management system 110 effectively waits for a lease pricing trigger. However, if the CRE management system 110 determines that a lease pricing trigger has occurred, then the Yes branch is taken to step 302.

In step 302, the CRE management system 110 sends a lease pricing request to the property analysis server 102. The lease pricing request can be sent via the WAN 104 to an endpoint provided by the lease benchmarking service 116, for example. In this particular example, the lease pricing request includes at least an address for a property, and optionally includes a current actual lease value, a space type, and/or any other property data associated with the property.

In step 304, the CRE management system 110 receives a predicted lease value for the property from the property analysis server device 102 in response to the lease pricing request. The predicted lease value can be an absolute value or a value range for the property, for example, and can be generated as will be described in more detail below.

Figure 4:
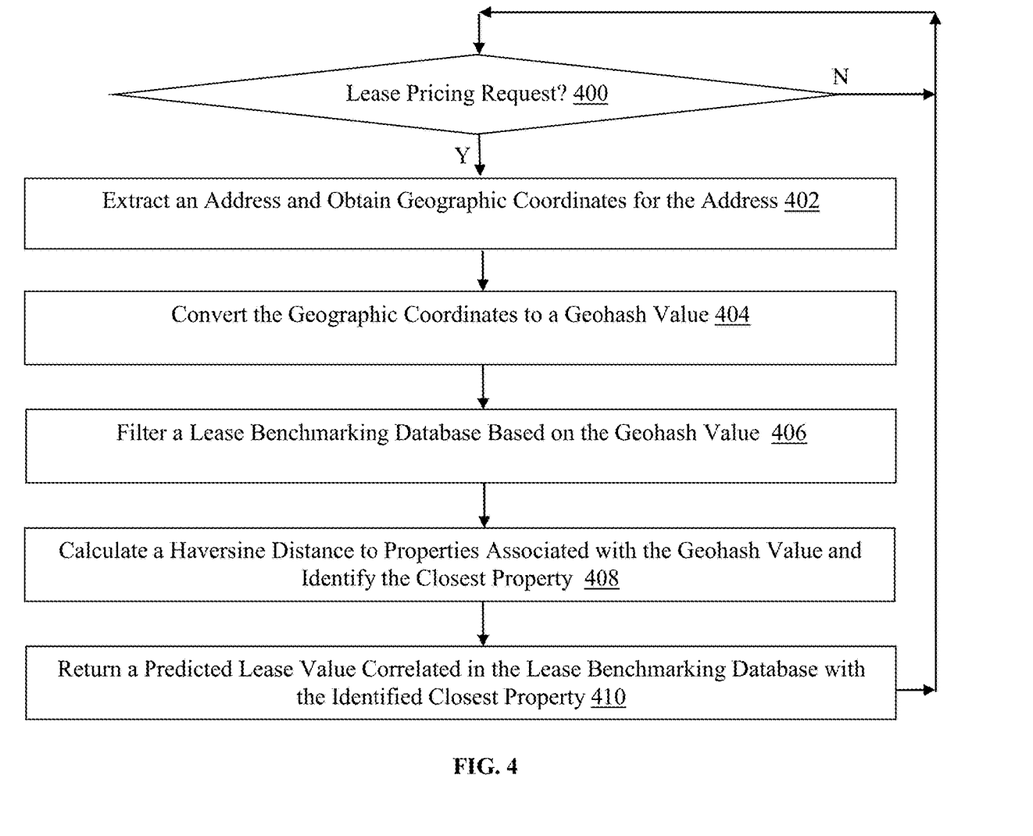
FIG. 4 is a flowchart of an exemplary method for providing a lease benchmarking service that uses a lease benchmarking database to provide predicted lease values.

Referring to FIG. 4, a flowchart of an exemplary method for providing a lease benchmarking service that uses a lease benchmarking database to provide predicted lease values is illustrated. In step 400 in this example, the property analysis server device 102 determines whether a lease pricing request has been received, such as from the CRE management system 110, for example. If the property analysis server device 102 determines that a lease pricing request has not been received, then the No branch is taken back to step 400 and the property analysis server device 102 effectively waits for a lease pricing request to be received.

While waiting for a lease pricing request, or in parallel with processing a lease processing request, the property analysis server device 102 can populate or update the lease benchmarking database 208, as described and illustrated in detail below with reference to FIG. 6, for example. However, if the property analysis server device 102 in this particular example determines that a lease pricing request has been received, then the Yes branch is taken to step 402.

In step 402, the property analysis server device 102 extracts an address for a property from the lease pricing request and obtains geographic coordinates for the address. In this example, the property analysis server device 102 obtained the geographic coordinates by sending the extracted address to the maps platform server 106 using the provided API 118, although other methods for obtaining the geographic coordinates can also be used in other examples. The geographic coordinates in this example includes a latitude and longitude for the property.

In step 404, the property analysis server device 102 converts the geographic coordinates obtained in step 402 to a geohash value. A geohash value results from a hashing or binning technique that takes the longitude and latitude and maps them to a string of letters and numbers that correspond to an area on a grid. Accordingly, geohashing takes a single point and buckets it into a group with other nearby points depending on a defined precision level. In some examples, the lease benchmarking service 116 leverages a module or library in the Python programming language, which provides functions for decoding and encoding geohash values to and from latitude and longitude coordinates, to convert the latitude and longitude coordinates to the geohash value in step 404, although other methods for generating a geohash value can also be used.

Figure 5:
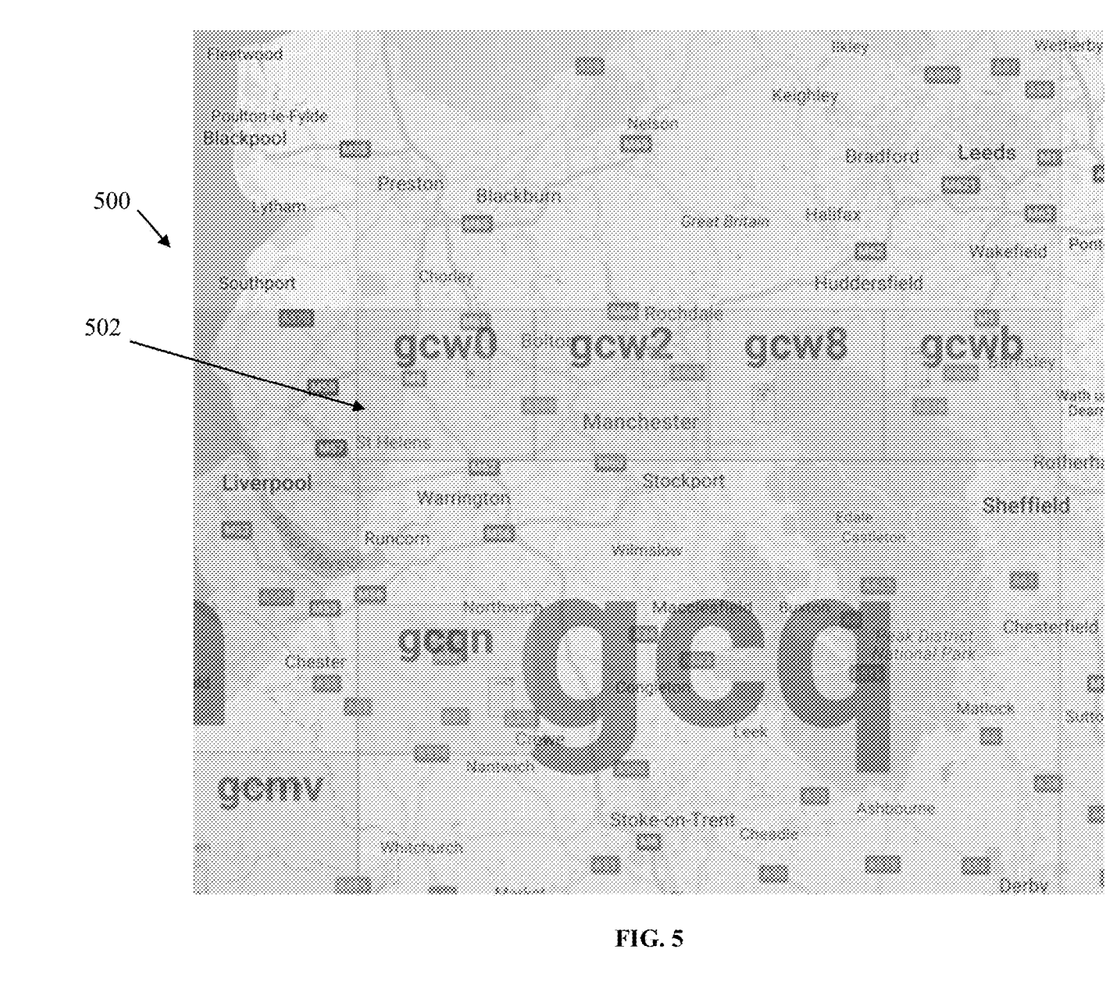
FIG. 5 is an exemplary geohash map.

Referring to FIG. 5, an exemplary geohash map 500 is illustrated. In this example, "gcwo" is a geohash value for an area 502 of a grid represented in the geohash map 500. The size of the area 502 depends on defined parameter(s), which can be provided to the geohashing Python programming language module by the lease benchmarking service 116, for example. Accordingly, a geohash value as used herein refers to any value that is correlated with a portion (e.g., area 502) of a geographic region or space, which can optionally be broken into a grid or other pattern to facilitate a geohashing algorithm and definition of the various portions.

Referring back to FIG. 4, in step 406 in this example, the property analysis server device 102 filters the lease benchmarking database 208 based on the geohash value obtained in step 404. In this particular example, the lease benchmarking database 208 is asynchronously generate or populated and subsequently used by the property analysis server device 102 to generate predicted lease values. In some examples, the lease benchmarking database 208 is repopulated, or updated, periodically (e.g., monthly), although other methods for maintaining the lease benchmarking database 208, including synchronous methods responsive to received lease pricing requests, can also be used in other examples.

Figure 6:
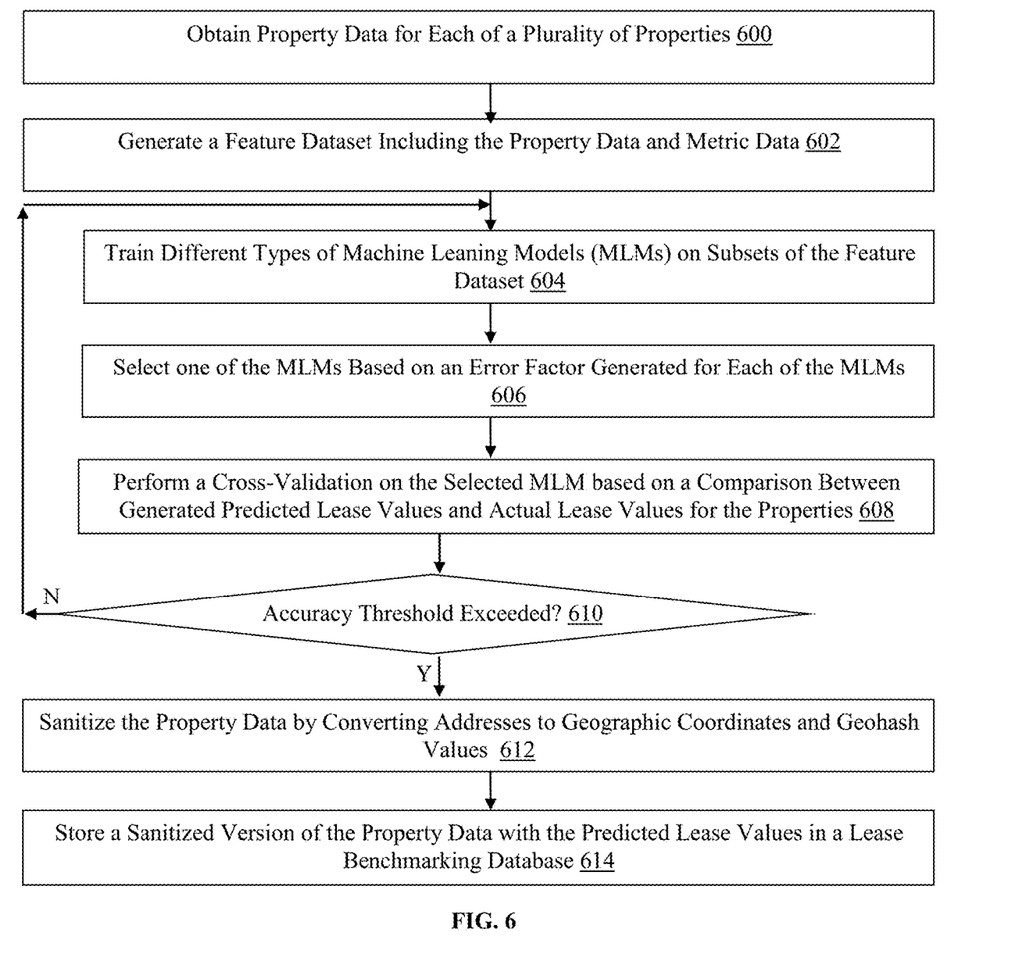
FIG. 6 is a flowchart of an exemplary method for using machine learning models to populate a lease benchmarking database that is indexed by geographic coordinates and geohash values.

Referring to FIG. 6, a flowchart of an exemplary method for using machine learning models to populate the lease benchmarking database 208 that is indexed by geographic coordinates and geohash values is illustrated. In step 600 in this example, the property analysis server device 102 obtains property data for each of a plurality of properties that can be associated with any number of geographic regions, CRE portfolios, and/or enterprises, for example. In some examples, the property data, or a portion thereof, is obtained from a third party property data server 108, as explained above. The property data includes at least an address and an actual lease value for each of the properties, and optionally includes space usage (e.g., office, retail, or warehouse), location (geocodes or postal codes), lease type, and/or other geographic, demographic and socio-economic factors, for example, although other types of property data can also be obtained in step 600.

In step 602, the property analysis server device 102 generates a feature dataset including the property data and metric data generated from the property data. The metric data can include average lease price for particular postal code or other property data parameter, median square footage for an identified neighborhood or other geographic region, or any other metric calculated from aggregated subset(s) of the raw property data obtained in step 600.

In step 604, the property analysis server device 102 trains different types of MLMs on subsets of the feature dataset. In some examples, the different types of MLMs can be random forest model, support vector machine (SVM) model, another type of regression model, or any other type of MLM. The subsets of the feature dataset can be different in some examples and, in other examples, all of the feature dataset can be used to train the various types of MLMs.

In step 606, the property analysis server device 102 selects one of the MLMs based on an error factor generated for each of the MLMs. The error factor can be a median absolute error or a percent absolute error, for example, although other error factors can also be used. Accordingly, the property analysis server device 102 effectively selects an optimal or most accurate one of the different types of MLMs for the particular feature dataset of training date.

In step 608, the property analysis server device 102 performs a cross-validation on the MLM selected in step 606 (i.e., MLM 212). The cross-validation includes splitting the feature dataset into portions or subsets each associated with a subset of the properties, retraining the MLM 212 based on a first one of the subsets of the feature dataset, and then testing the retrained MLM 212 using a second one of the subset of the feature dataset. In the testing phase of the cross-validation, the actual lease values are not provided to the retrained MLM 212 and are instead compared to predicted lease values generated by the application of the retrained MLM 212 to the second subset of the feature dataset. The retraining and testing is then performed for a plurality, or all, permutations of the subsets of the feature dataset.

In step 610, the property analysis server device 102 determines whether an accuracy threshold is exceeded by the selected MLM based on the cross validation and associated comparison between predicted lease values and actual lease values. The accuracy threshold can be based on a threshold number of predicted lease values that deviated from actual lease values by more than a threshold or any other evaluation metric. If the property analysis server device 102 determines that the accuracy threshold is not exceeded, then the No branch is taken back to step 602, and the property analysis server device 102 retrained various types of MLMs optionally using different types of MLMs and/or different property data or feature dataset(s) in a subsequent iteration. However, if the property analysis server device 102 determines that the accuracy threshold is exceeded, then the Yes branch is taken to step 612.

In step 612, the property analysis server device 102 sanitizes the property data obtained in step 600 by converting the addresses for the properties associated with the property data to geographic coordinates and geohash values.

For commercial properties with multiple leases within a particular building, for example, the geographic coordinates and/or geohash value will sanitize or genericize the property data, while also allowing for predictive analytics and lease benchmarking as explained in more detail below. The addresses can be converted to geographic coordinates and geohash values as described and illustrated in more detail above.

In step 614, the property analysis server device 102 stores the sanitized property data with the predicted lease values generated during the cross-validation in the lease benchmarking database 208. Accordingly, the stored lease benchmarking database 208 includes at least predicted lease values generated based on the application of the MLM 212 associated or correlated with geographic coordinates and geohash values for at least a subset, and optional all, of the properties for which property data was obtained in step 600.

Referring back to FIG. 4, in step 408, the property analysis server device 102 calculates a haversine distance to properties associated with the geohash value obtained in step 404 for geographic coordinates associated with an address of a property identified in the lease pricing request received in step 400. A haversine distance is the angular distance between two points on the surface of a sphere, and is therefore an approximation of the distance between two points on the Earth's surface. Accordingly, based on the haversine distance, the property analysis server device 102 identified the closest property in the lease benchmarking database 208.

Figure 7A:
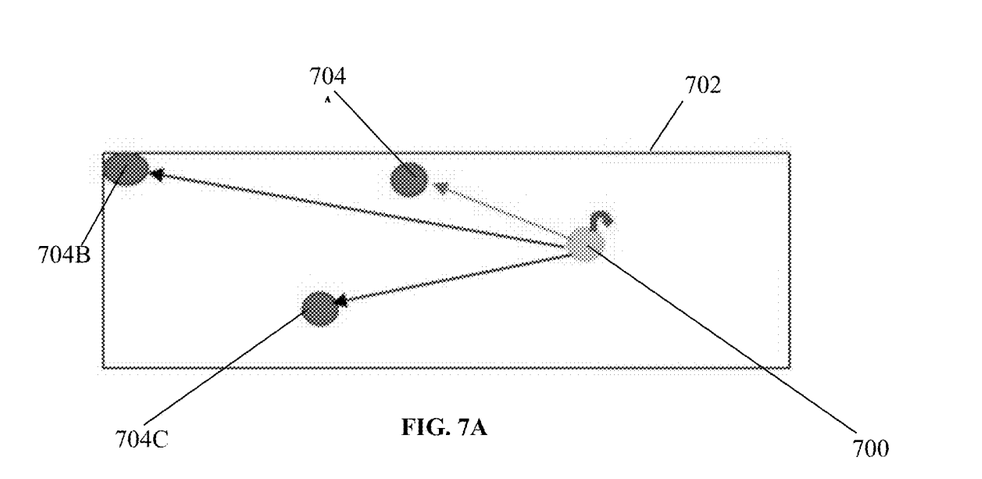
FIGS. 7A-B illustrate haversine distance determinations for exemplary geohash values to facilitate predicted lease values based on geographic proximity.

Referring to FIGS. 7A-B, a haversine distance determinations for exemplary geohash values to facilitate predicted lease values based on geographic proximity is illustrated. In FIG. 7A, the point 700 represents the geographic coordinates obtained in step 402, which are within the region 702 corresponding to the geohash value obtained in step 404. Additionally, the points 704A-C represent the geographic coordinates for the other properties identified in the lease benchmarking database 208 as a result of the filtering based on the geohash value performed in step 406, for example. In this particular example, the geographic coordinates for the point 700 has an exact match in the lease benchmarking database 208 and the haversine distance for the matching property is zero.

Figure 7B:
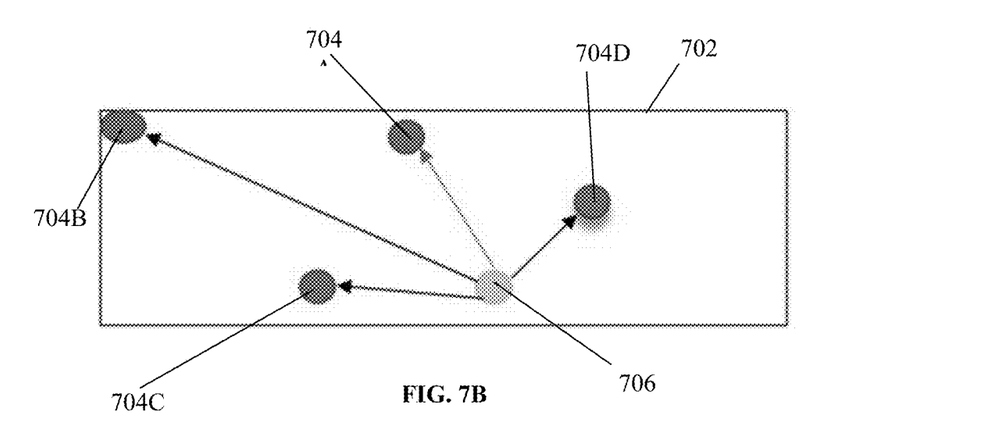

In FIG. 7B, the point 706 represents the geographic coordinates obtained in step 402, which are within the region 702 corresponding to the geohash value obtained in step 404. Additionally, the points 704A-D represent the geographic coordinates for the other properties identified in the lease benchmarking database 208 as a result of the filtering based on the geohash value performed in step 406, for example. Accordingly, in this example, the haversine distances are calculated in step 408 from point 706 to each of points 704A-D, with the haversine distance to point 704D being the smallest. Thus, the property associated with point 704D in the lease benchmarking database 208 is identified in step 408 as the closest property with respect to geographic proximity.

Referring back to FIG. 4, in step 410, the property analysis server device 102 returns a predicted lease value correlated in the lease benchmarking database 208 with the identified closest property. Accordingly, the property analysis server device retrieves the previously-stored predicted lease value associated with the identified closest property and returns the retrieved predicted lease value in response to the lease pricing request received in step 400, such as to the CRE management system 110 in this particular example.

Referring back to FIG. 3, in step 306 in this example, the CRE management system 110 determines whether a notification is required based on the predicted lease value obtained in step 304. In some examples, a notification is always required, such as when the lease pricing trigger relates to an expiring lease. IN other examples, the CRE management system 110 can determine whether a notification is required based on a threshold difference between a predicted lease value and a stored actual lease value for the property. Other methods for determining whether a notification is required can also be used in other examples. If the property analysis server device 102 determines that a notification is not required, then the property analysis server device 102 proceeds back to step 300. However, if the property analysis server device 102 determines that a notification is required, then the Yes branch is taken to step 308.

In step 308, the CRE management system 110 sends an automated notification based on stored contact information, such as to one of the user devices 112(1)-112(n), for example. The notification can be a short message service (SMS) message, e-mail message, graphical interface provided via an application hosted by the CRE management system 110, or any other type of automated notification or message. The notification can include information regarding the current lease price and/or predicted lease value, and can facilitate budgeting for a future year or negotiating a better or fair lease agreement, for example, among other uses. Subsequent to sending the automated notification, the property analysis server device 102 proceeds back to step 300. In other examples, one or more of steps 302-308 can be performed in parallel for any number of lease pricing triggers initiated by any number of CRE management systems, for example.

As described and illustrated by way of the examples herein, this technology provides MLMs with improved training based on feature datasets that include raw property data for a plurality of properties and metric data generated therefrom. Different types of MLMs are tested and cross-validated to generate an optimal, selected MLM, which is used to populate the lease benchmarking database 208 with more accurate predicted lease pricing values correlated with geographic data. The lease benchmarking database 208 is then advantageously leveraged by third parties (e.g., CRE management system 110) to obtain more accurate predicted lease values for properties based on providing minimal information, which may include only a property address.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for improved machine learning modeling to facilitate automated commercial lease benchmarking, the method implemented by a property analysis server device and comprising:

training, by one or more processors of the property analysis server device, machine learning models (MLMs) on a feature dataset comprising property data for properties and metric data, wherein the property data comprises at least an address and an actual lease value for each of the properties, each of the MLMs comprises a different MLM type, and the property data is retrieved via a wide area network from one or more property data servers;

cross-validating a selected one of the MLMs comprising iteratively retraining the selected one of the MLMs using subsets of the feature dataset, generating predicted lease values for the properties, and comparing the actual lease values to the predicted lease values to determine that the selected one of the MLMs exceeds an accuracy threshold;

storing the property data in a lease benchmarking database in a memory of the property analysis server device, wherein the addresses are replaced in the stored property data with corresponding first geographic coordinates and geohash values and the properties are associated in the lease benchmarking database with the predicted lease values;

sending via the wide area network an address included in a lease pricing request to a maps platform server based on a provided application programming interface (API) to obtain second geographic coordinates for the address, wherein the lease pricing request is received from a user device via an enterprise network coupled to the wide area network;

generating a haversine distance to a subset of the properties associated with a geohash value in the lease benchmarking database to identify one of the subset of the properties, wherein the geohash value is identified based on the second geographic coordinates; and returning to the user device via the enterprise network and the wide area network one of the predicted lease values in response to the lease pricing request, wherein the one of the predicted lease values is identified in the lease benchmarking database based on a determined geographic proximity of the address to the one of the subset of the properties.

2. The method of claim 1, further comprising comparing the predicted lease values to at least a subset of the actual lease values to determine whether the accuracy threshold is exceeded.

3. The method of claim 1, further comprising generating the metric data from one or more aggregated subsets of the property data.

4. The method of claim 1, further comprising selecting the MLM based on an error factor generated for each of the MLMs, wherein the error factor comprises a median absolute error or a percent absolute error.

5. A property analysis server device, comprising memory comprising programmed instructions stored thereon for improved machine learning modeling to facilitate commercial lease benchmarking and one or more processors configured to execute the stored programmed instructions to:

train machine learning models (MLMs) on a feature dataset comprising property data for properties and metric data, wherein the property data comprises at least an address and an actual lease value for each of the properties, each of the MLMs comprises a different MLM type, and the property data is retrieved via a wide area network from one or more property data servers;

cross-validate a selected one of the MLMs comprising iteratively retraining the selected one of the MLMs using subsets of the feature dataset, generating predicted lease values for the properties, and comparing the actual lease values to the predicted lease values to determine that the selected one of the MLMs exceeds an accuracy threshold;

store the property data in a lease benchmarking database in the memory, wherein the addresses are replaced in the stored property data with corresponding first geographic coordinates and geohash values and the properties are associated in the lease benchmarking database with the predicted lease values;

send via the wide area network an address included in a lease pricing request to a maps platform server based on a provided application programming interface (API) to obtain second geographic coordinates for the address, wherein the lease pricing request is received from a user device via an enterprise network coupled to the wide area network;

generate a haversine distance to a subset of the properties associated with a geohash value in the lease benchmarking database to identify one of the subset of the properties, wherein the geohash value is identified based on the second geographic coordinates; and return to the user device via the enterprise network and the wide area network one of the predicted lease values in response to the lease pricing request, wherein the one of the predicted lease values is identified in the lease benchmarking database based on a determined geographic proximity of the address to the one of the subset of the properties.

6. The property analysis server device of claim 5, wherein the processors are further configured to execute the stored programmed instructions to compare the predicted lease values to at least a subset of the actual lease values to determine whether the accuracy threshold is exceeded.

7. The property analysis server device of claim 5, wherein the processors are further configured to execute the stored programmed instructions to generate the metric data from one or more aggregated subsets of the property data.

8. The property analysis server device of claim 5, wherein the processors are further configured to execute the stored programmed instructions to select the MLM based on an error factor generated for each of the MLMs, wherein the error factor comprises a median absolute error or a percent absolute error.

9. A non-transitory computer readable medium having stored thereon instructions for improved machine learning modeling to facilitate commercial lease benchmarking comprising executable code which when executed by one or more processors of a property analysis server device, causes the processors to:

train machine learning models (MLMs) on a feature dataset comprising property data for properties and metric data, wherein the property data comprises at least an address and an actual lease value for each of the properties, each of the MLMs comprises a different MLM type, and the property data is retrieved via a wide area network from one or more property data servers;

cross-validate a selected one of the MLMs comprising iteratively retraining the selected one of the MLMs using subsets of the feature dataset, generating predicted lease values for the properties, and comparing the actual lease values to the predicted lease values to determine that the selected one of the MLMs exceeds an accuracy threshold;

store the property data in a lease benchmarking database in a memory of the property analysis server device, wherein the addresses are replaced in the stored property data with corresponding first geographic coordinates and geohash values and the properties are associated in the lease benchmarking database with the predicted lease values;

send via the wide area network an address included in a lease pricing request to a maps platform server based on a provided application programming interface (API) to obtain second geographic coordinates for the address, wherein the lease pricing request is received from a user device via an enterprise network coupled to the wide area network;

generate a haversine distance to a subset of the properties associated with a geohash value in the lease benchmarking database to identify one of the subset of the properties, wherein the geohash value is identified based on the second geographic coordinates; and return to the user device via the enterprise network and the wide area network one of the predicted lease values in response to the lease pricing request, wherein the one of the predicted lease values is identified in the lease benchmarking database based on a determined geographic proximity of the address to the one of the subset of the properties.

10. The non-transitory computer readable medium of claim 9, wherein the executable code when executed by the processors further causes the processors to compare the predicted lease values to at least a subset of the actual lease values to determine whether the accuracy threshold is exceeded.

11. The non-transitory computer readable medium of claim 9, wherein the executable code when executed by the processors further causes the processors to generate the metric data from one or more aggregated subsets of the property data.

12. The non-transitory computer readable medium of claim 9, wherein the executable code when executed by the processors further causes the processors to select the MLM based on an error factor generated for each of the MLMs, wherein the error factor comprises a median absolute error or a percent absolute error.

* * * * *